(12) United States Patent
Baran et al.

(10) Patent No.: US 10,165,222 B2
(45) Date of Patent: Dec. 25, 2018

(54) VIDEO CAPTURE WITH FRAME RATE BASED ON ESTIMATE OF MOTION PERIODICITY

(71) Applicant: Intel Corporation, Santa Clara, CA (US)

(72) Inventors: Stanley J. Baran, El Dorado Hills, CA (US); Barnan Das, Newark, CA (US); Richmond Hicks, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/178,323

(22) Filed: Jun. 9, 2016

(65) Prior Publication Data

US 2017/0359549 A1 Dec. 14, 2017

(51) Int. Cl.
| | |
|---|---|
| *H04N 5/77* | (2006.01) |
| *H04N 5/232* | (2006.01) |
| *H04N 5/353* | (2011.01) |
| *H04N 21/00* | (2011.01) |

(52) U.S. Cl.
CPC ............ *H04N 5/772* (2013.01); *H04N 5/2327* (2013.01); *H04N 5/23258* (2013.01); *H04N 5/3532* (2013.01); *H04N 21/00* (2013.01)

(58) Field of Classification Search
CPC .. H04N 5/772; H04N 5/23258; H04N 7/0117; H04N 7/0127; G11B 20/00007; G11B 2020/00072

USPC ......................................................... 386/242
See application file for complete search history.

(56) References Cited

U.S. PATENT DOCUMENTS

| | | | | |
|---|---|---|---|---|
| 5,973,733 | A * | 10/1999 | Gove ..................... | H04N 5/145 348/142 |
| 2011/0206344 | A1* | 8/2011 | Simpson ................ | G09G 5/003 386/230 |
| 2013/0308002 | A1* | 11/2013 | Jiang ................... | H04N 5/23222 348/208.6 |
| 2014/0086452 | A1* | 3/2014 | Ukil .......................... | G06T 7/20 382/103 |
| 2015/0254852 | A1* | 9/2015 | Yamato ................ | A61B 6/5288 345/634 |
| 2015/0335949 | A1* | 11/2015 | Lokshin ............... | A61B 5/7246 700/91 |
| 2016/0007158 | A1* | 1/2016 | Venkatraman ........ | H04W 4/023 455/456.2 |
| 2017/0054890 | A1* | 2/2017 | Wilt ..................... | H04N 5/2357 |
| 2017/0187961 | A1* | 6/2017 | Katz .................. | H04N 5/23267 |

* cited by examiner

*Primary Examiner* — Loi H Tran
(74) *Attorney, Agent, or Firm* — Womble Bond Dickinson (US) LLP

(57) ABSTRACT

Video capture is described in which the video frame rate is based on an estimate of motion periodicity. In one example, a period of motion of a moving object is determined at a sensor device. A frame capture rate of a video camera that is attached to the moving object is adjusted based on the period of motion. Video frames are captured at the adjusted frame rate, and the captured video frames are stored.

20 Claims, 10 Drawing Sheets

VIDEO CAPTURE WITH FRAME RATE BASED ON ESTIMATE OF MOTION PERIODICITY

FIELD

The present description relates to the field of video capture and in particular to setting a frame rate for video capture.

BACKGROUND

Recent years have seen strong growth in the use of action and adventure cameras. Many people now have ready access to portable cameras that can be attached to people, vehicles, buildings, and even to animals. At the same time more Internet traffic is focused on viewing videos. Many of these videos are produced with small portable action cameras, but even professional quality video cameras are becoming more affordable and more common in use.

When a camera is attached to a moving object, the viewer will see the movement in the captured video. This works well if the moving object moves smoothly and changes speed gradually. However, a vehicle moving across a road, a trail, or the sea will hit bumps. A runner will move up and down with each step. Most moving objects move in ways that are distracting or unpleasant for the viewer of the video.

For most video capture scenarios, the video camera must be stabilized in order for the video to be pleasing to watch and easy to follow. This is especially true for action cameras mounted to a bicycle, skateboard, or other vehicle and for wearable cameras. Typically cameras have been stabilized using expensive heavy mechanical stabilizers that hold the camera in a fixed position as the stabilizer is moved by a vehicle or other carrier. Mechanical camera stabilizers are very effective and are ubiquitous in high end video production.

More recently optical image stabilization (OIS) moves one or more optical elements in the camera lens to counter physical movements of the camera. This requires a more expensive lens system, an inertial references system in the camera, and an actuator to receive detected movement and move some of the optical elements very quickly.

Electronic image stabilization (EIS) analyzes the images and detects motion between frames. This requires extra boundary pixel regions around the image so that the center of the image can be shifted in any direction to compensate for camera motion. If there are no available pixels outside of the image, then edges of the image are estimated by interpolation or some other technique. EIS is limited by the feature tracking algorithm and the clarity of features in the video. A video in which all the features are moving may not successfully be de-jittered. Another electronic post-processing approach is to use gyroscope or accelerometer information from the camera and then move the center of the video frames in response. These post-processing techniques require some time and some processing power to realize.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

Figure 1:
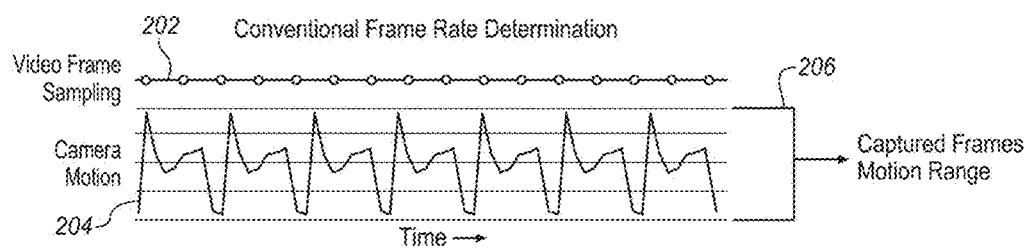
FIG. 1 is a graph of a periodic motion over time and a conventional frame capture rate.

As described herein the data from one or more inertial sensors, such as gyroscopes and accelerometers, may be used to estimate the periodicity of the physical motion of a video camera or of an object to which the camera is attached. Based on the periodicity, the frame rate of the camera's video capture may be adjusted. The adjustment may be done in real time to match the periodic motion, or a multiple of the periodicity of the motion.

Periodicity in the motion may be estimated in any of a variety of different ways. In one example, an autocorrelation is performed on the inertial sensor data. Peaks are found in the auto correlated signal and then a period is determined for at least some of the peaks. The periodic peaks are used to determine a video camera frame rate.

Existing digital video stabilization techniques may be augmented or replaced by leveraging the periodic motion of the camera. This may be a periodic motion caused by macro activities that inherently produce periodic motions such as biking, running, walking and driving. It may also be used for micro activities for which the periodicity is more subtle such as vibrations and shakes. The periodicity of the motion may be used reliably no matter what the conditions of the scene are. It is not affected by low light, features with soft or no edges, and lens flare. Moreover, there is no need for post processing with the described technique. An estimation of the periodicity may be made in real time and the frame rate of the camera may be adjusted accordingly as the video is captured.

By using the periodicity to determine a frame rate of the camera, there may be very different frame rates for different types of motion. Some activities such as jogging or boating have a slower period. For any such slow periodic motion, the stabilized video capture frame rate will also be slow. This may be played directly at conventional frame rates as a time-lapsed video. Alternatively, through interpolation, in between frames may be added to play the video in real time. As a further alternatively, the video may be played at a slow frame rate.

Other activities such as cycling, operating motor vehicles, etc. have a faster periodic motion. This motion is more like vibrations than like steps. Adjusting the frame rate based on the motion periodicity will provide improved video stabilization with more conventional frame rates.

Video capture frame rates have been standardized around film projection and tube television technology and have been selected to be the slowest frame rate that provides a satisfying result for viewers in these technologies. The frame rates are fixed in order to simplify the design and construction of film projectors and televisions. As an example, motion pictures are captured at 24 frames per second (FPS), corresponding to 24 film images through a video camera per second. American television is based on 29.97 FPS to correspond to the 60 Hz AC electrical signal used to drive a television set. Time-lapse videos are typically captured 1/30 FPS (once in 30 seconds) or more. Slow motion videos are shot at 120 FPS or higher, even as high as 25,600 FPS for specialized applications. Other systems operate at other pre-determined set frame rates. A camera captures video frames only as a function of time and not as a function of its orientation. This fundamentally gives rise to instability in the videos when the camera undergoes any physical motion.

Due to these conventions, video cameras operate at a fixed frame rate regardless of its physical circumstances and any motion. While recording videos, frames are sampled at a pre-determined frequency which matches the pre-determined configuration of video player applications.

FIG. 1 is a graph of an example of a periodic motion of an object with time on the horizontal axis and vertical position on the vertical axis. A similar type of graph may be used to represent motion in any direction or a combination of motions. The upper line 202 indicates the video frame sampling rate where each frame is captured at a location corresponding to the dot. In this example the video frame sampling rate is fixed. This would correspond to a standard 24, 30, or 60 fps rate. The position of the camera is indicated by the lower line 204 or graph. As shown the camera moves vertically with a periodic motion. As determined by the indicated motion 204, the position of the camera is different for each frame capture. Capturing the frames at the indicated frame sampling rate will cause the camera to be at a different position for each frame capture so that the resulting video will jitter, stutter, or shake. In other words, the intra-frame physical motion range of the camera is very high, leading to instability in the captured video. The range of motion 206 indicates the distance between different camera positions for the captured frames.

Figure 2:
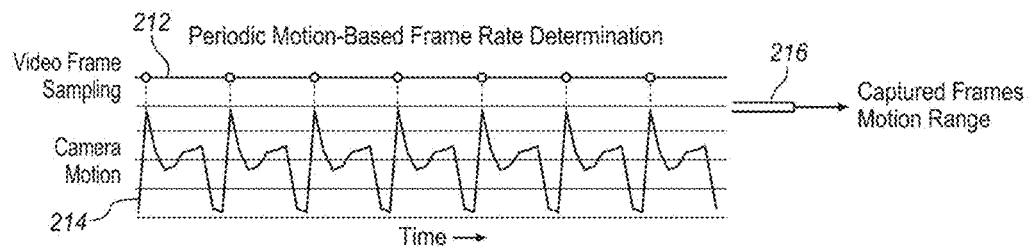
FIG. 2 is a graph of the periodic motion of FIG. 1 with an adjusted frame capture rate according to an embodiment.

As described herein, a physical motion-aware camera may be created that dynamically changes its frame rate based on the periodic motion of the camera. FIG. 2 is a graph of the same physical motion 214 versus time. However, the video frame sampling rate 212 is adjusted based on the camera motion. In other words, the periodicity of the camera's physical motion is harnessed to dynamically determine the video capture frame rate. This reduces the intra-frame physical motion range 216 and improves stability between the video frames.

In one embodiment the camera's physical motion is determined using the raw data from inertial sensors such as accelerometers and gyroscopes embedded within the camera device. The inertial sensors may also be part of a wearable device such as a wrist band, smart ear buds, smart watch, smart phone, and smart active wearables. Based on the inertial sensor data, the periodicity of the camera's motion may be estimated using signal processing techniques.

The estimation of periodicity may be made at the camera device, or any other device that is physically connected to the camera device and that has a sensor. The device that captures the video frames will be referred to as the camera device and the device that measures the periodicity of the motion will be referred to herein as the sensor device. These camera devices and the sensor device may be the same device or a different device. They may be attached to the same housing or chassis or completely separate and discrete.

The sensor device is attached so that it is able to measure the motion that is of interest for the video capture. In some embodiments, the sensor device is a different device that is attached to the same carrier as the camera. As an example, for jogging, the user may have a camera attached to a helmet, a shoulder harness, or to some other part of his body. The sensor may be in the camera, or in a separate device such as a smart phone, smart watch, wrist or chest band, ankle band, shoe, etc. Data about the motion is fed from the sensor device to the camera device causing the camera to change its frame rate accordingly. The sensor device may provide an estimated period of motion including synchronization and frequency data. Alternatively, the sensor may send less processed motion data and a system at the camera device may convert it to the synchronization and estimated periodicity.

Even if the sensed motion is not the motion of the camera, the periodicity may still be used. In jogging, the periodicity of the motion of the user will be approximately the same for all parts of the body. The amplitude and the direction of the motion may be different for different parts of the runner's body, but the periodicity will be the same. As an example, a runner's hands and feet have a wide range of motion when running, but the torso and the head move comparatively little. A similar principle applies to many other contexts. The camera's frame rate is not based on the amount or direction of the motion but only based on the period or frequency of the motion. In some cases, the video will be suitable as is with the adjusted frame rate. In other cases, more stabilization will be required.

The period or frequency may be estimated at intervals. These intervals may be fixed or adjusted based on selected factors. The estimated period is updated after each interval so that the frame rate may be changed as the motion changes. This has a result of adjusting the camera's frame rate in real time. As an example, a user may start off an activity by jogging with a certain number of steps per minute and then speed up or slow down to another number of steps per minute. Similarly, if there is an uneven roadway with regular bumps, then the bumps may come at different speeds as the vehicle speeds up and slow down. During the activity span the user's speed can increase or decrease in any random order.

Most video capture and playback systems are locked to a particular frame rate or set of frame rates. As described above, the camera sensor dynamically changes the frame rates based on data from a sensor device. This may render the video unusable with some standard video file formats and with some video players. Accordingly, frame rate conversion techniques may be used to add or remove frames to obtain a particular desired frame rate for a particular use case. This may be possible to do in the camera but is more likely done in a post processing system.

Figure 3:
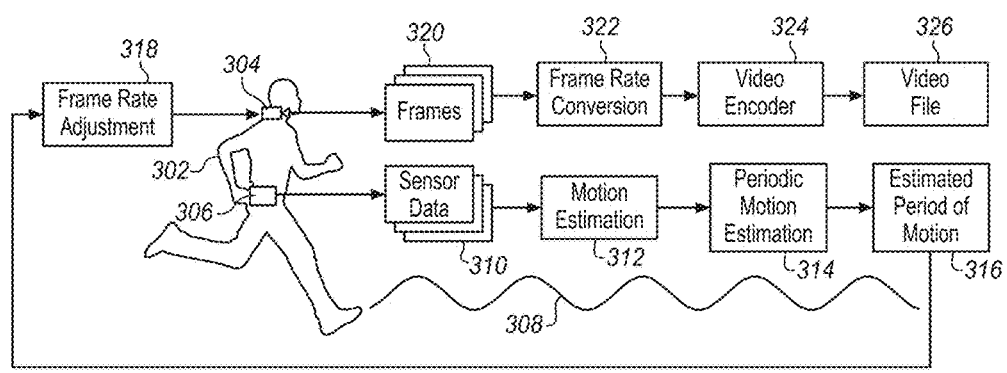
FIG. 3 is a diagram of a sensor and a camera operating to adjust a frame capture rate based on a periodic motion rate according to an embodiment.

FIG. 3 is a diagram of using sensor data to adjust the frame rate of a camera. In this example a runner 302 is wearing a camera device 304 on a shoulder harness. However, the camera may be carried in any of a variety of other ways such as a helmet, shirt, belt, waist pack, collar, or other type of shoulder device. The runner is also carrying a separate sensor device 306 on a belt. The separate sensor device allows the camera device to be made smaller, however, as mentioned above, the two devices may be combined, if desired. The runner runs at some pace that produces at least an up and down motion 308 corresponding to each step. The runner is used as an example, however, the techniques described herein may be applied to many different human, mechanical, and vehicular activities.

The sensor device produces sensor data 310. The sensor data is used to estimate the motion of the sensors 312 which corresponds to the motion of the runner. Other embodiments of estimating the periodicity could use frequency analysis of signals, such as the power spectral density estimate. Any of a variety of different types of sensors may be used. While silicon accelerometers are readily available, such an inertial sensor is not required. The motion estimate is then used to determine the periodicity of the motion 314. The periodicity then provides the estimated motion period or frequency 316. This data is then provided to a frame rate adjustment 318 that is sent to the camera device.

The frame rate adjustment is sent to the camera device 304 from the sensor device 306. The camera device then captures frames at the adjusted frame rate 320. The frame sequence may then optionally have a frame rate conversion 322 and then be encoded 324 to produce a video file 326. By adjusting the frame rate the camera will be at about the same position for each captured frame. Additional motion compensation may be applied. However, with a much smaller range 216 of motion as shown in FIG. 2, conventional digital motion compensation will be much more effective.

The sensor device blocks for estimating motion 312, periodicity 314, and period 316 may be interpreted as software modules for processing buffered sensor data 310. These modules then produce an adjustment signal 318 that is applied to the camera. These operations may be performed in a general purpose processor by software or in a firmware or hardware by dedicated components. These operations may also be performed in the camera device.

Similarly the frame rate conversion 322 and encoding 324 may be performed on buffered video frames 320 to produce an output video file 326. These operations may be performed on processors as software modules or as dedicated firmware or hardware.

Figure 4:
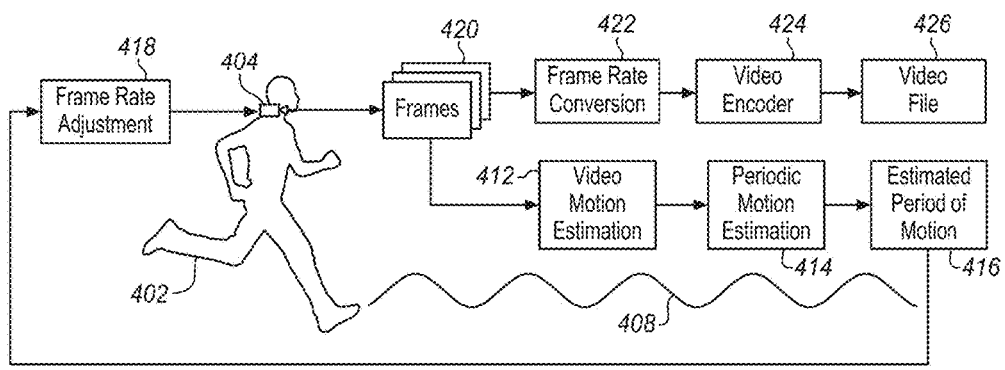
FIG. 4 is a diagram of a combined sensor and a camera operating to adjust a frame capture rate based on a periodic motion rate according to an embodiment.

FIG. 4 is a diagram of a runner with an alternative system for varying frame rate based on periodicity estimated using the camera video output. In this example a runner 402 carries a camera 404 in some location that allows the camera to have a desired field of view, such as a shoulder harness or any other carrier. The camera produced a sequence of frames 420. The frames are captured at a frame rate and then frame rate conversion 422 may optionally be applied. The frames are then encoded 424 to produce a video file 426 that may be stored or transmitted or both. As mentioned above additional operations may be performed to the video such as further stabilization, color and contrast compensation etc. or the video may be further post-processed.

In this example, the video frames 420 are further analyzed to estimate the motion 412 between frames. The estimated motion is used to estimate the periodicity of the motion 414 which is used to determine the period of the motion 416 and then generate a frame rate adjustment 418 based on the detected motion. The motion estimation may use any of a variety of digital motion estimation techniques. Typically higher accuracy is obtained for bright scenes with sharp edges and higher frame rates. However interpolation may be used across several frames to estimate a period of motion that is faster than the frame rate. In this example, the camera will continue to adjust the frame rate to reduce motion between frames. This allows the system to also compensate for changes in the runner's pace.

Video motion estimation (VME) 412 is particularly well-suited to situations in which the camera body does not move independently of the runner's body and to situations in which the relative motion of the camera to the moving body is known. For VME, periodicity is not necessarily measured directly. Instead, camera rate adjustments may be made in such a way as to minimize the scene motion per time interval. In a simple embodiment, the frame rate is increased or decreased and the motion per time is seen to increase or decrease. Frame rate adjustments are continued in the direction of decreasing scene motion until a threshold is reached.

In many scenarios, it is possible for the camera to have a non-uniform velocity in its periodic motion. In such situations, the camera's exposure time may be synchronized with the longest possible, least variance velocity. Further quality enhancement may be done to tune the periodicity estimation to a specific direction of acceleration. As an example, the periodicity may be based on Z or vertical movement because that is the primary direction of movement for a runner. In a more complex embodiment, all or multiple directions are used, for example X, Y and Z directions relative to the video frame. These are then weighted for example, to give less importance to the Z direction.

Figure 5:
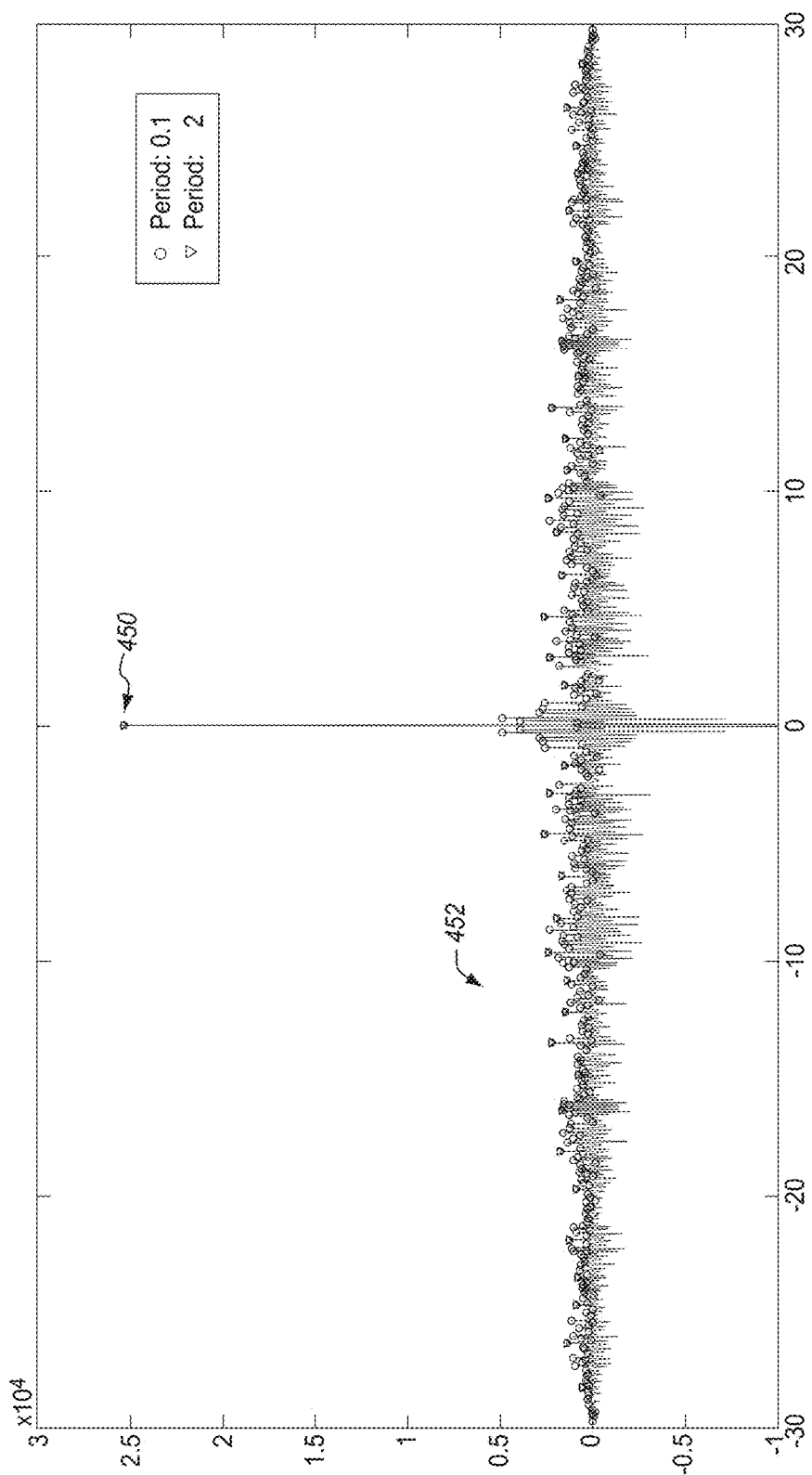
FIG. 5 is a graph of an autocorrelation of a periodic motion according to an embodiment.

FIG. 5 is a graph of an autocorrelation-based periodicity estimation for jogging activity with motion on the vertical axis and seconds on the horizontal axis. The autocorrelation graph corresponds to inertial sensor data collected using an accelerometer attached to a participant's chest while jogging. The raw data for X, Y and Z axis acceleration was collected at a sampling rate of 20 Hz. The autocorrelation-based periodicity estimation (in seconds) for the jogging activity using the magnitude of X, Y, Z acceleration values of the participant is shown in the graph. The sample rates of the inertial sensor data may be adjusted to obtain periodicity that matches a higher fps rate of video capture or to correspond to activities with a higher periodicity. As shown there is a very strong autocorrelation 450 in the graph with a wide spread of much lower correlation 452.

Figure 6:
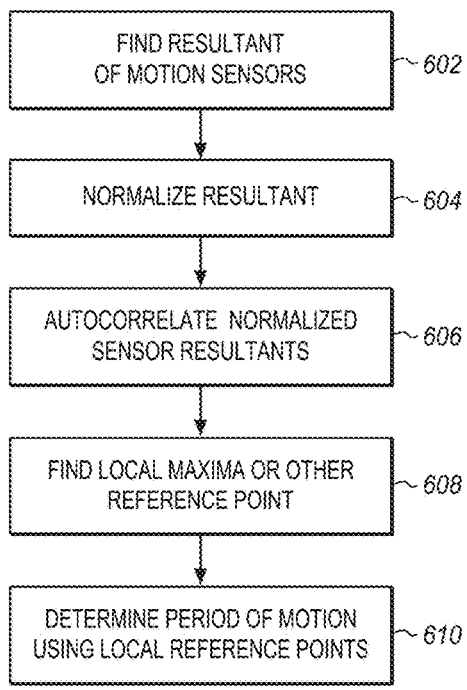
FIG. 6 is a process flow diagram of determining a period of camera motion according to an embodiment.

One embodiment of periodicity estimation is using autocorrelation of the inertial sensor data. FIG. 6 is a process flow diagram of the autocorrelation. At 602 the resultant of each inertial sensor is found. This is done in different ways depending on the nature of the sensor. For a tri-axial accelerometer the resultant may be determined as defined in Equation 1:

$$acc_{res}(n) = \sqrt{(acc_x(n))^2 + (acc_y(n))^2 + (acc_z(n))^2} \quad \text{(Eq. 1)}$$

$-\infty < n < +\infty$, and n is sampled at frequency $f_s$

Alternatively, multiple sensors may be used and the signals may be combined as appropriate depending on the nature of the sensors. One such example is as defined in Equation 2:

$$sensors_{res}(n) = \sqrt{(acc_{res}(n))^2 + (gyro_{res}(n))^2} \quad \text{(Eq. 2)}$$

At 604 having found the resultant signals, they may be normalized using any desired normalization factor. One such example is provided in Equation 3:

$$\text{sensor}_{norm}(n) = \text{sensor}_{res}(n) - \text{mean}(\text{sensor}_{res}(n)) \quad \text{(Eq. 3)}$$

At 606 the normalized resultant signals are autocorrelated. A typical autocorrelation function is as provided in Equation 4.

$$\text{sensor}_{autocor}(l) = \Sigma_{n=-\infty}^{\infty} \text{sensor}_{norm}(n) \text{sensor}_{norm}(n-l) \quad \text{(Eq. 4)}$$

Where l=lag

Given the autocorrelation, it can be used to find the locations of the local maxima at 608. These are the peaks of the autocorrelated sensor signal from Equation 4. The local maxima may be considered to be a data sample that is larger than the data samples that are in its local area.

At 610, the period is determined as the average time difference between the local maxima. The period of the motion may then be used as a frame rate adjustment for the video capture.

In the provided examples, the local maxima are used. Local minima or any other reliable reference point may alternatively be used. For jogging and other motions that are vertical, especially those that have an upward jump against gravity, the motion is the slowest at the vertical peak. The vertical motion when jogging is roughly sinusoidal so that the up and down motion is faster compared to the upper and lower peaks. As a result when frames are captured at the height of the vertical capture then less precision is required because the motion is slowest at the vertical peaks. Different patterns may be used for other types of motion.

The frame rate adjustment may include not only a period but also a synchronization signal. This synchronization is not required because a frame rate at the proper frequency will capture a frame at the same position in the motion curve each time. This position may be anywhere on the motion cycle 214 of e.g. FIG. 2. For improved results, the frame capture may also be synchronized to a particular position in the motion curve. The best position is flatter part of the curve so that minor inconsistencies in the motion or in the camera have a small effect on the position of the camera. For sinusoidal motion the maxima and minima have the slowest movement and so these positions provide the most stable motion capture results. The best position for frame capture in any particular motion curve will depend on the motion curve.

Figure 7:
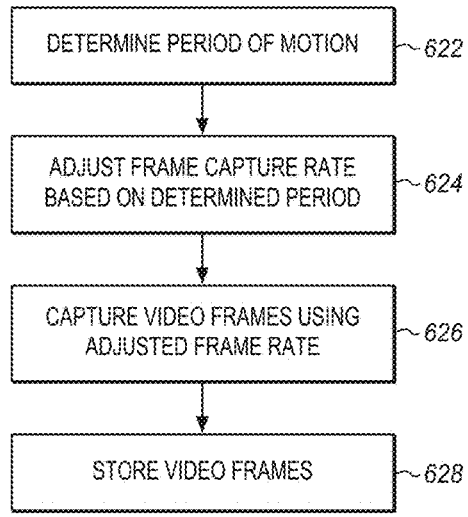
FIG. 7 is a process flow diagram of capturing video with an adjustable frame rate according to an embodiment.

FIG. 7 is a process flow diagram for adjusting a video capture frame rate based on motion periodicity. At 622, the period of the motion is determined. This may be done as shown in FIG. 6, using VME, or in any other desired way. This may be done in a sensor device or a camera device as described above. At 624, the video capture frame rate is adjusted using the determined motion period. At 626 video is capture using the adjusted frame rate and at 628, the video frames are stored. Additional operations may be performed including stabilization, frame rate conversion, image editing, encoding, and various other editing functions. The stored video may be displayed locally or transferred to a separate playback device. This may include uploading to a server or a broadcast head end system.

To display the video, a display system may display the video in real time so that the frames are played back at the same rate at which they were captured. Game consoles and computers are capable of displaying video at many different frame rates. Smart televisions continue to increase available processing power and also have the processing resources to present video at different rates. As an alternative the video may be played back at a standardized frame rate even though it was recorded at another frame rate. Considering the jogger of FIGS. 3 and 4, he may have a pace of 2 or 3 steps per second. If the video is played back at 30 frames per second then it will be played back ten times faster. As a result a two hour run will be viewed in fast motion in less than 15 minutes. This option to play back the video at a much faster rate may make the video much more engaging to view.

While some embodiments may use a global shutter for the sensor, many present video cameras use digital sensors that operate with a rolling shutter. In rolling shutter imagers, the sensor is read out one row at a time so that it takes some time for all of the rows to be read. For video, the camera uses a blanking interval between each frame. When the frame rate is changed, the blanking interval is not and the exposure is spread across the full readout time. In some cases, by adjusting the frame rate to a slower periodic motion of the camera, the camera's rolling shutter time is stretched across a longer time period. This increases the motion artifacts.

Figure 8:
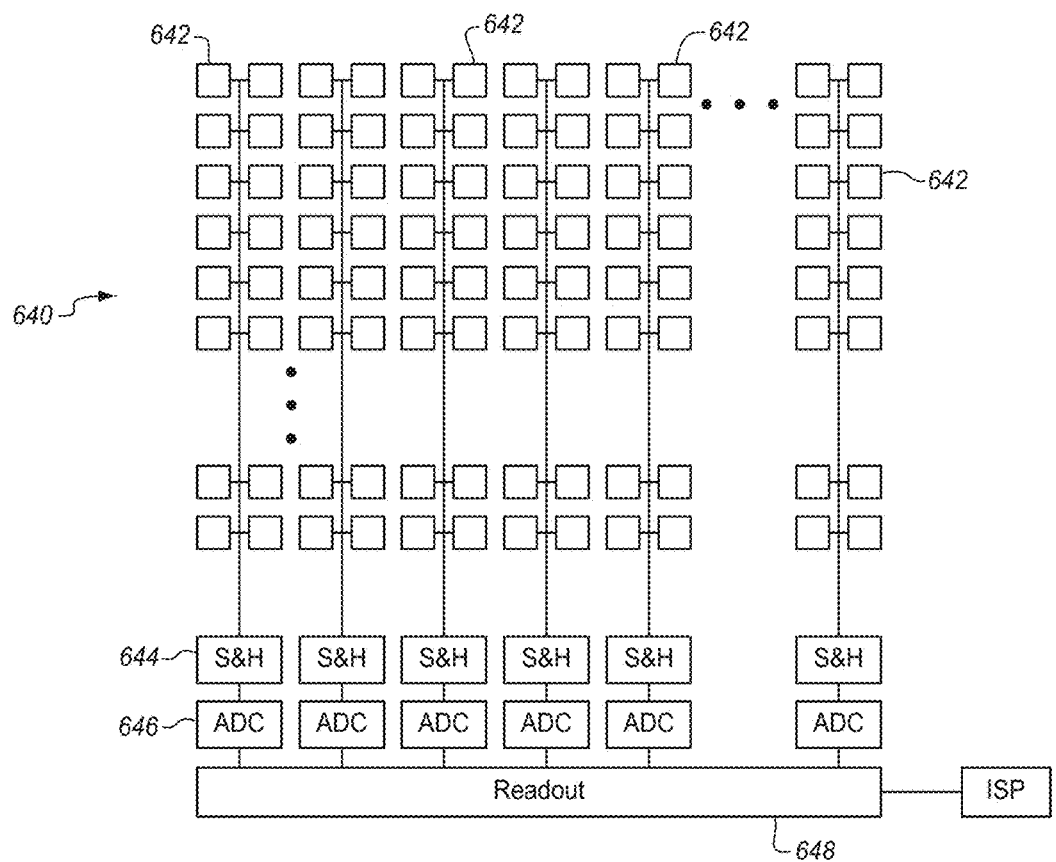
FIG. 8 is a diagram of a video camera image sensor and capture system with a rolling shutter.

FIG. 8 is a diagram of an image sensor 640 using a rolling shutter to read out the pixels. In this example, the individual pixels are indicated by squares 642. Each pixel will be red, green, blue, or some other color in an arrangement to enhance the image quality. The pixels are grouped into rows and columns and each set of two or four pixels is read out one row at a time. All pixels in a row are read out at about the same time in parallel. The pixels are always collecting charge and cannot be turned off so the exposure time at each pixel is controlled by resetting each pixel and then collecting or reading out the charge at a respective sample and hold 644 one exposure time after the reset.

The resets and reads are staggered to provide a "just in time" readout at the line rate. With a sample and hold for every two columns and shared for all rows, the total amount of circuitry is reduced. The collected charge is sent to a connected analog to digital converter 646 and then to a readout controller 648. The readout controller accumulates the readings for all of the pixels and sends it to an image processor to form an image or video frame.

With this approach the reset and read at the last row occurs after the reset and read of the first row. If an object in the scene has moved between these two times or if the camera has moved, then the same object will appear in different locations in different parts of the image. These motion artifacts are typically removed in the image processor after a frame is captured.

Figure 9:
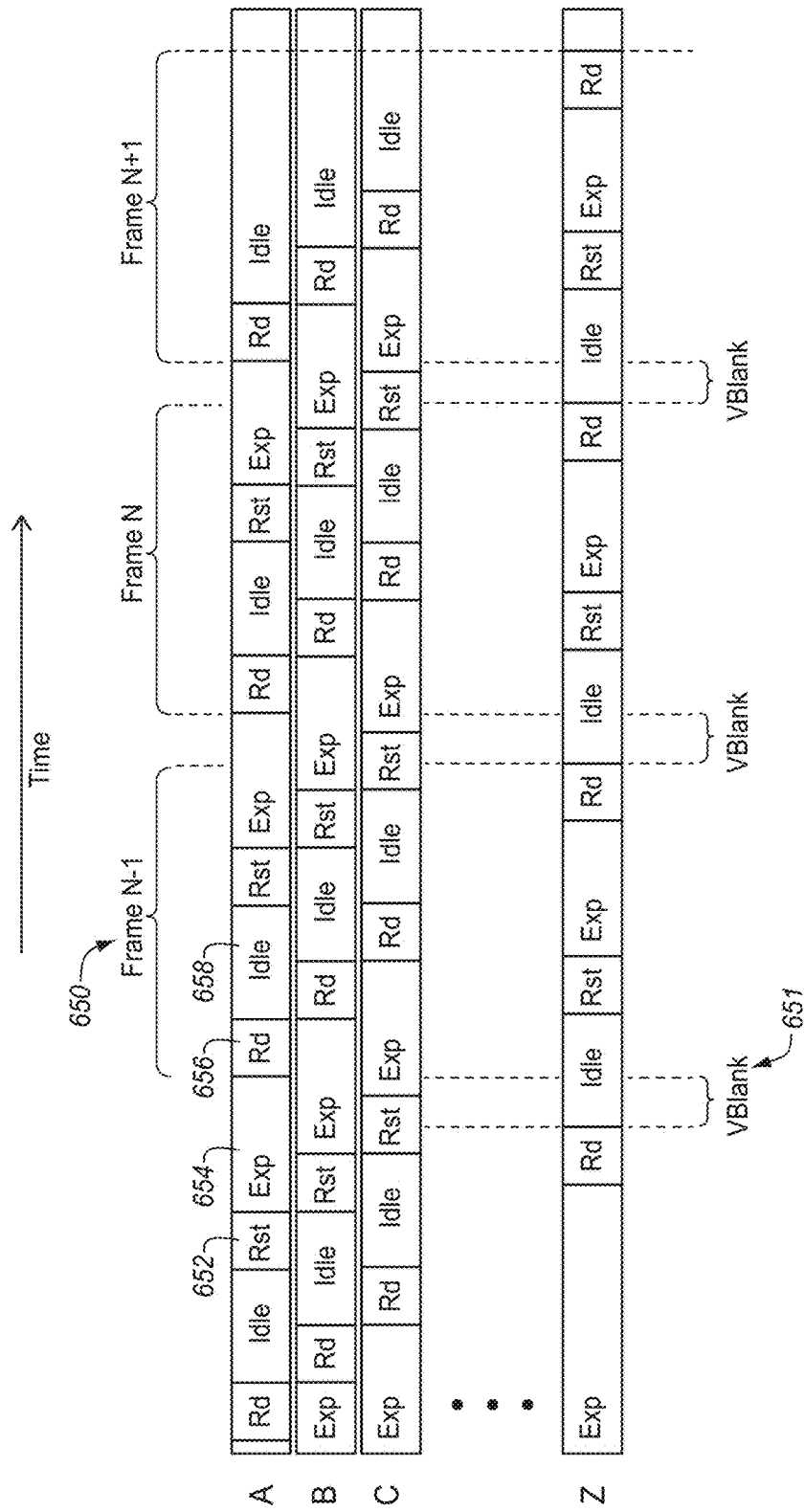
FIG. 9 is a diagram of captured video frames over time from an image sensor.

FIG. 9 is a time line showing a sequence of video frames as captured by the image sensor on the horizontal axis. The frames are captured by pixel row, as mentioned above. Each row A-Z in the drawing figure corresponds to a row of pixels on the sensor. Typically there are thousands of rows but only a few are shown to avoid obscuring the diagram. Each image or frame 650 starts with a reset 652, then an exposure 654, then a read 656, and finally an idle time 658. The next exposure follows after the first exposure. There is a single reset, exposure and read for each row. For the entire frame, the total exposure time includes the reset, exposure, and read for all of the rows. The total frame time is indicated as from the start of the first read to the end of the last read, or the start of read in row A to the end of the read in row Z.

The time interval between the end of the last read for one frame and the start of the first read for the next frame is referred to as a vertical blanking interval 651. No image data is captured during this interval. The interval is determined by the frame rate, the idle times for each row and the staggering between reading each row.

As shown each row is staggered in time as compared to the row above and below. In other words, row B is reset after row A and before row C. In this example, the rest of the next row starts after the rest of the row above is finished and the exposure of the row above has started. Because the exposure for each row is the same, the read for each row is also staggered. Row B is read after Row A is finished being read and before Row C starts being read. Reading each row in sequence allows the read hardware to be shared between rows, reducing heat, cost and complexity of the image sensor. Because each exposure on each row is preceded by a reset and followed by a read, the time difference between a reset and a read on the same row is equal to the exposure time.

The pixel exposure value for each pixel in a row is determined only during the exposure time. Any light incident on a pixel before a reset is erased and any light incident on a pixel after a read is not capture by that read. As shown in this simplified diagram, the exposure for row Z starts after the exposure for row A is completed. In some scenes some objects may move quickly enough that the object is in a different location during the exposure of row A than during the exposure of row Z or even row D. Since there are thousands of rows, a fast moving object may have traveled some distance between the time of the first row and the time of the last row or the time of the first row in which the object is visible and the time of the last row in which the object is visible. This movement shows up on the captured frame as an object that is in different position in different places of the same frame. The resulting motion artifact is typically referred to as a rolling shutter artifact.

Figure 10:
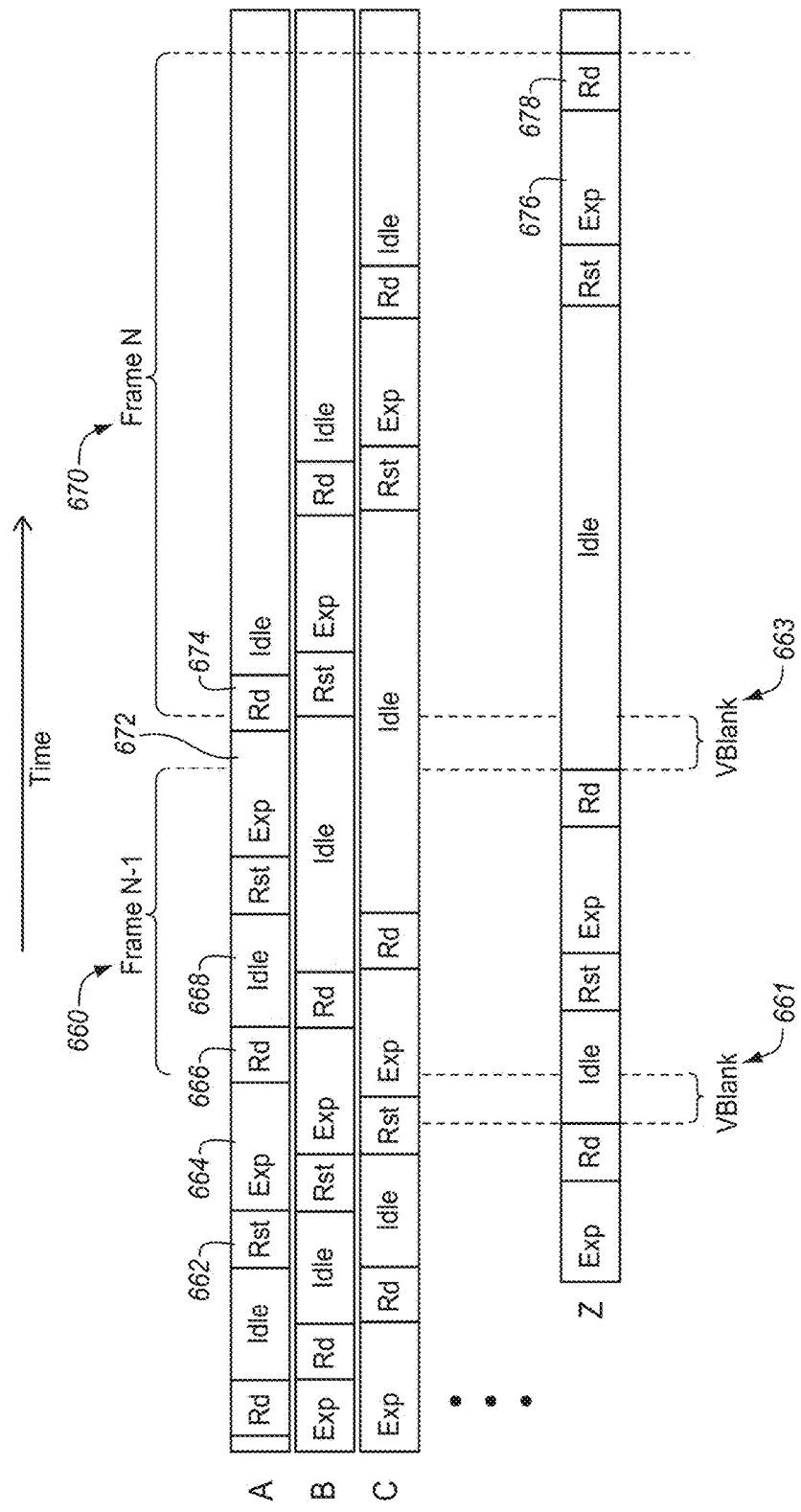
FIG. 10 is a diagram of captured video frames having an adjusted frame capture rate according to an embodiment.

FIG. 10 is a time line showing a sequence of video frames as captured by the image sensor at a slower video frame capture rate where each row in the figure corresponds to a row of pixels on the image sensor. The capture rate has been slowed by changing the clock input into the image sensor. The first frame 660 is shown as being captured at the normal clock and frame rate and the second frame is captured at the reduced frame rate. The first frame 660 has an initial reset 662, exposure time 664, read time 666 and idle time 668. These are substantially the same as in FIG. 9. For the second frame 670 the frame is slowed, however, the exposure time is adjusted based on the available light levels.

To adjust the exposure time at the slower clock rate, the idle time is increased. As shown an exposure 664 for the row A in the first frame 660 is about the same length as the exposure 672 for the second frame 670 but the corresponding idle time is much longer. The bracket for the duration of the first frame 660 extends from the start of the read on row A to the end of the read on row Z. The bracket for the second frame 670 shows a much longer duration because of the slower clock rate. For the second frame the read for the rows spreads across the full frame time. This is a normal approach to changing the frame rate.

The vertical blanking interval 661 for the first frame is the same as in the previous figure and is provided for reference. For the second frame, the blanking interval 663 is longer by the amount that the clock rate has been slowed. As shown in the first frame the row B read closely follows the row A read. In the second frame there is a longer time interval after the row A read ends before the row B read starts.

The longer exposure time will increase the motion artifacts. For bright scenes, the image sensor may reduce the exposure time and extend the idle time but the frame time will not be changed. The variable frame rate technique described herein may accordingly produce video with more significant motion artifacts than systems with fixed frame rates. The motion artifacts may be addressed as shown in FIG. 11.

Figure 11:
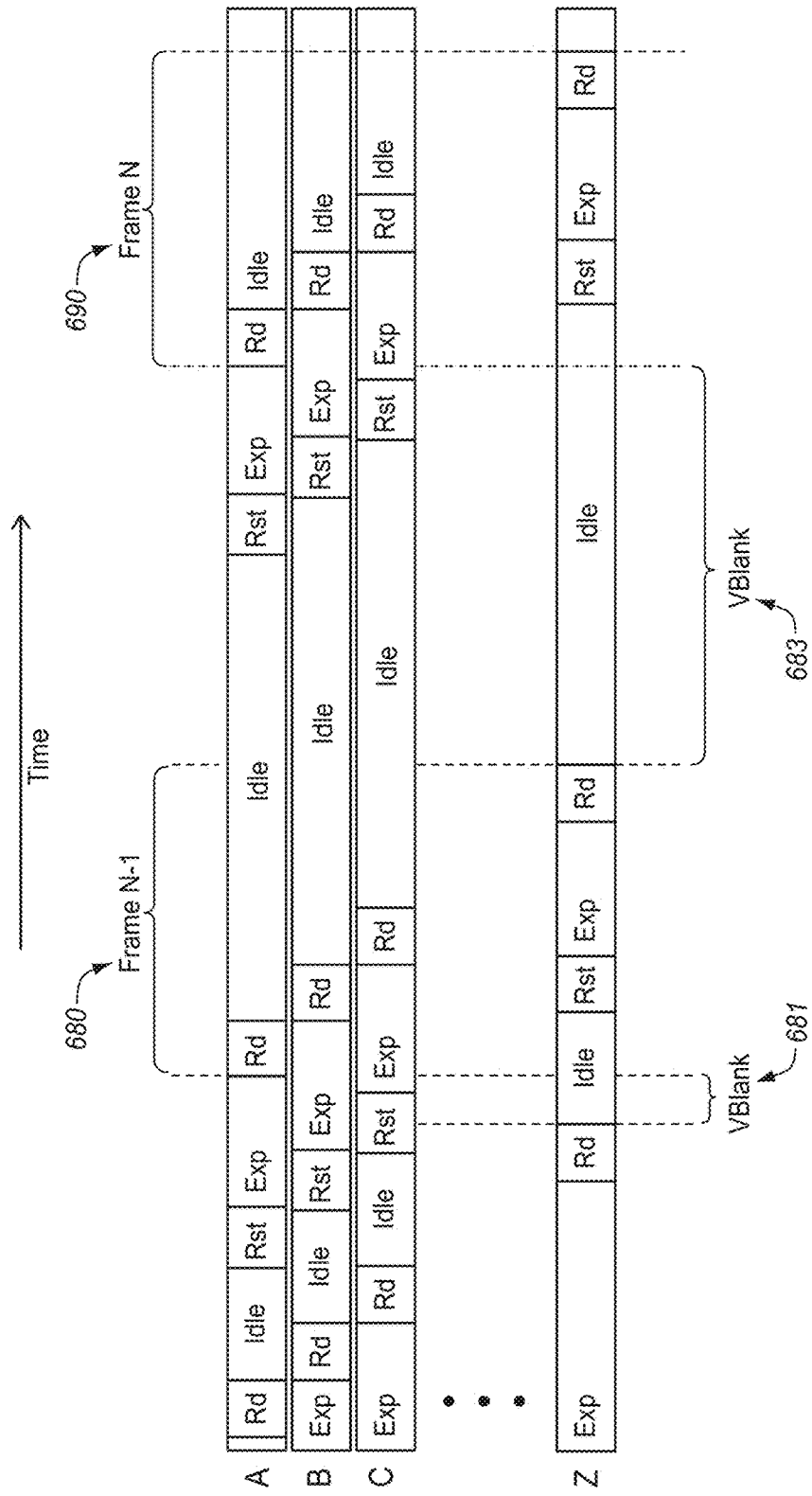
FIG. 11 is a diagram of captured video frames having an adjusted frame capture rate for reduced motion artifacts according to an embodiment.

FIG. 11 is another time line showing a sequence of video frames as captured by the image sensor at the same slower video frame capture rate as in FIG. 10. However, in this case the clock input into the image sensor is not changed. Instead, the idle time is reset to achieve the new slower frame rate. The first frame 680 shows each row being captured as in the previous diagrams for reference purposes. As a result, the first frame 680 has a normal initial reset, exposure, read and idle time. In the second frame 690, the slower frame capture rate is used and the reset, exposure, read and idle times are the same. In addition, the reads are staggered at the same rate as with the first frame. As a result the duration of the second frame 690 is the same as for the first frame 680 even though the frame capture rate is slower.

Instead of stretching out the frame times, the vertical blanking times are increased for the slower frame rate. The idle time or the vertical blanking time 683 for the second frame is much longer between exposures that for the first frame 681 in order to provide for the slower capture rate. By extending the idle time, the exposure and read time 680, 690 is unchanged but the frame rate is reduced. Since the readout time is the same as for higher capture rates, the motion artifacts are not increased when the capture rate is slowed.

Using the periodic motion determination, the vertical blanking period may be set and extended so that the exposure time or capture window is aligned with the steadiest period in the motion curve. In the examples above, this is the vertical peak height. The idle time then covers the steep vertical slope and the bottom of the curve. The best position for the idle time may be determined for each respective curve.

Rolling shutter artifacts may also be reduced using a rolling shutter compensation operation, module or block. Some such blocks are configured to reduce motion artifacts caused by camera shake as well as by movement of objects in the scene. The sensor device may feed the sensor data into the rolling shutter compensation operation, module or block as camera motion information. This block may then operate by stretching or compressing the exposure in the vertical direction based on the known camera motion and by aligning that motion in time with the exposure of each line.

Figure 12:
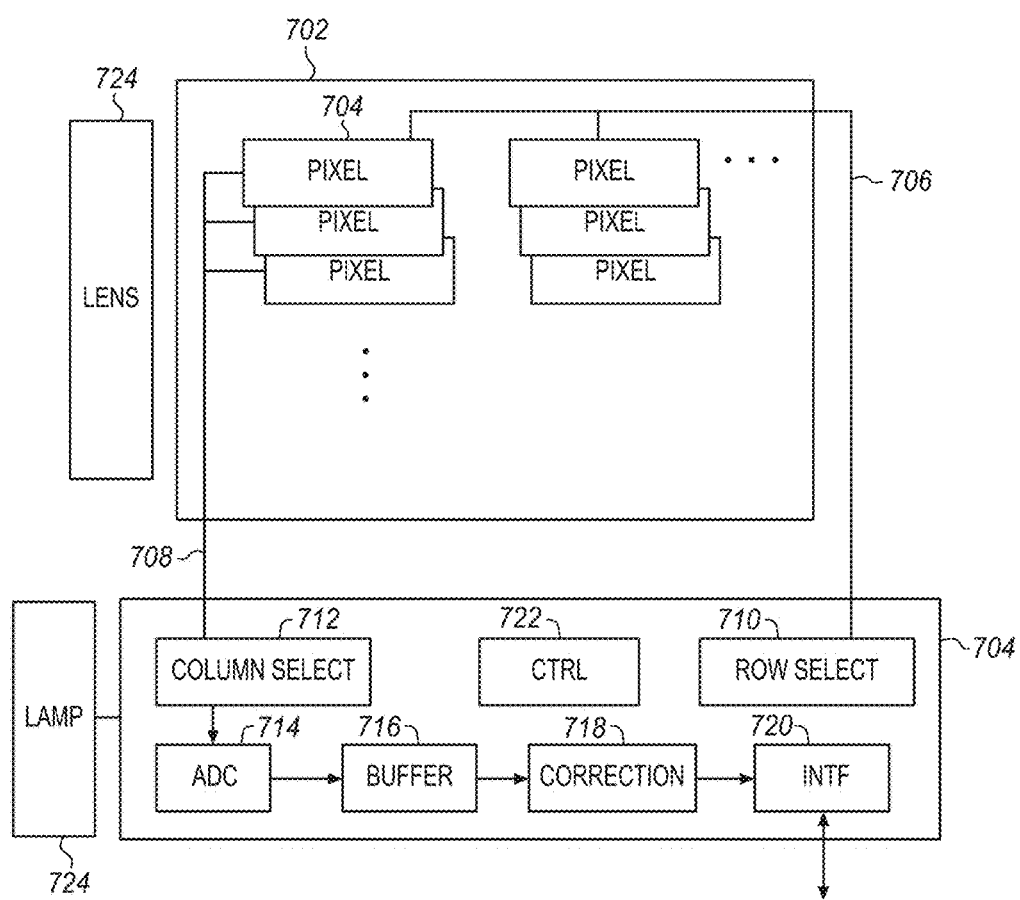
FIG. 12 is a block diagram of an image sensor with multiple photodetectors and adjustable frame rate capture according to an embodiment.
Figure 13:
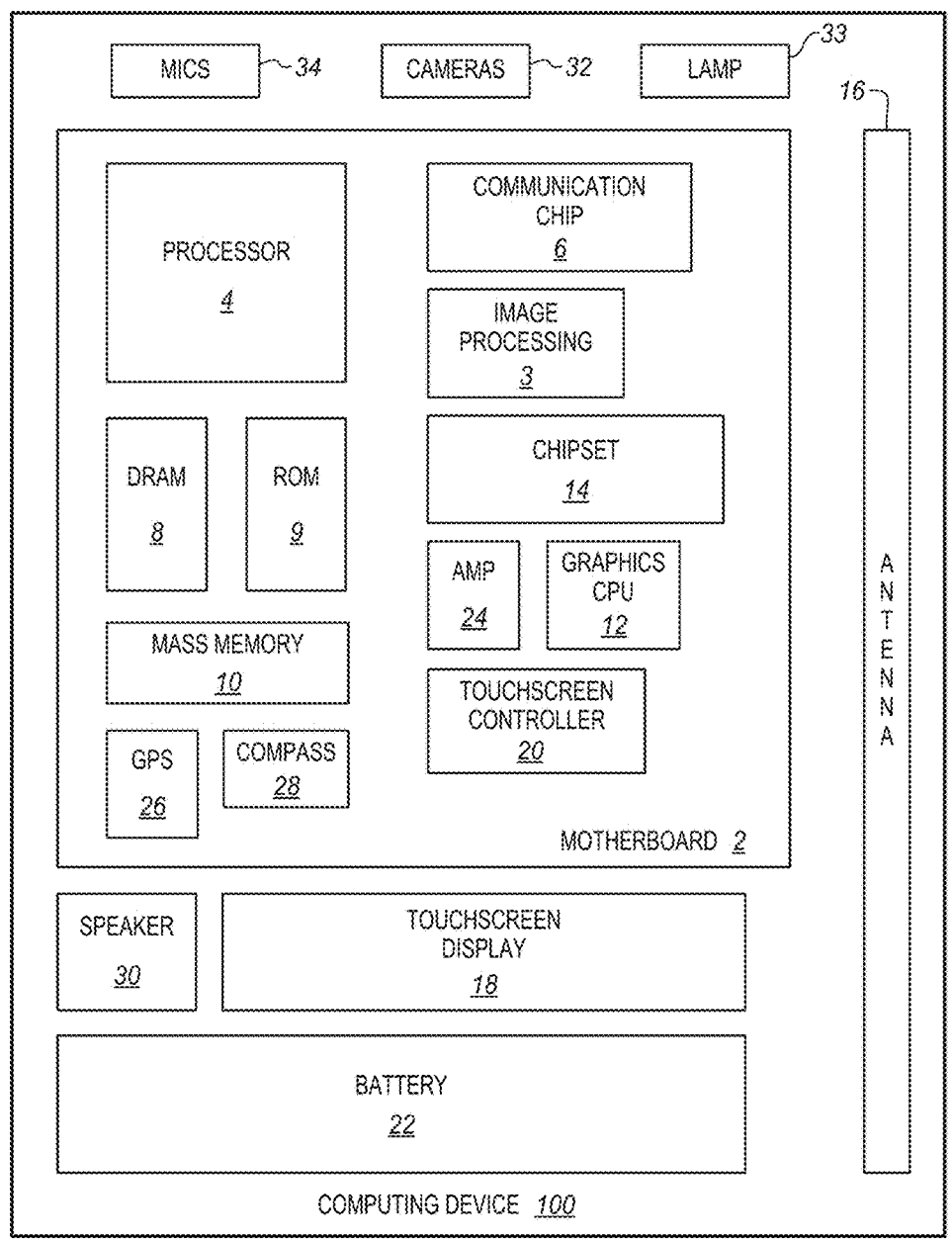
FIG. 13 is a block diagram of a computing device incorporating adjustable frame rate capture according to an embodiment.

FIG. 12 is a block diagram of an image sensor or camera system 800 that may include pixel circuits with variable video frame rates as described herein. The camera 800 includes an image sensor 802 with pixels typically arranged in rows and columns. Each pixel is coupled to a row line 806 and a column line 808. These are applied to the image processor 804.

The image processor has a row selector 810 and a column selector 812. The voltage on the column line is fed to an ADC (Analog to Digital Converter) 814 which may include sample and hold circuits and other types of buffers. Alternatively, multiple ADC's may be connected to column lines in any ratio optimizing ADC speed and die area. The ADC values are fed to a buffer 816, which holds the values for each exposure to apply to a correction processor 818. This processor may compensate for any artifacts or design constraints of the image sensor or any other aspect of the system. The complete image is then compiled and rendered and may be sent to an interface 820 for transfer to external components.

The image processor 804 may be regulated by a controller 822 and contain many other sensors and components. It may perform many more operations than those mentioned or another processor may be coupled to the camera or to multiple cameras for additional processing. The controller may also be coupled to a lens system 824. The lens system serves to focus a scene onto the sensor and the controller may adjust focus distance, focal length, aperture and any other settings of the lens system, depending on the particular implementation.

The controller may also be coupled to a lamp or projector 824. This may be an LED in the visible or infrared range, or another illumination source, depending on the particular application for which the lamp is being used. The controller coordinates the lamp with the exposure times to achieve different exposure levels.

FIG. 9 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a lamp 33, a microphone array 34, and a mass storage device (such as a hard disk drive) 10, compact disk (CD) (not shown), digital versatile disk (DVD) (not shown), and so forth. These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 contain image sensors with pixels or photodetectors as described herein. The image sensors may use the resources of an image processing chip 3 to read values and also to perform exposure control, depth map determination, format conversion, coding and decoding, noise reduction and 3D mapping, etc. The processor 4 is coupled to the image processing chip to drive the processes, set parameters, etc.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, a digital video recorder, wearables or drones. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes determining a period of motion of a moving object at a sensor device, adjusting a frame capture rate of a video camera attached to the moving object based on the period of motion, capturing video frames at the adjusted frame rate, and storing the captured video frames.

In further embodiments wherein determining a period of motion comprises collecting movement data from an inertial sensor connected to a video camera, autocorrelating the movement data, finding peaks in the auto-correlated movement data, and determining a period for at least some of the peaks.

In further embodiments determining a period of motion comprises estimating a motion using an inertial sensor, estimating periodicity of the motion, and estimating a period of motion using the periodicity.

In further embodiments determining a period of motion comprises analyzing captured frames from the video camera using video motion estimation.

In further embodiments the sensor device is attached to the camera device through the moving object.

In further embodiments the moving object is a person.

Further embodiments include performing a frame rate conversion on the captured video frames before storing.

In further embodiments performing a frame rate conversion comprises converting the frame rate to a standardized and fixed frame rate.

Further embodiments include encoding the captured video frames before storing.

In further embodiments adjusting a frame capture rate comprises adjusting a blanking interval between frames.

In further embodiments adjusting a frame capture rate comprises adjusting the frame rate without changing the frame capture duration of a rolling shutter.

Some embodiments pertain to an apparatus that includes a sensor device to determine a period of motion of a moving object, a camera device attached to the moving object to capture video frames at a frame capture rate, the video camera being coupled to the sensor device to receive the period of motion and to adjust the frame capture rate based on the period of motion, and a storage device to store the captured video frames.

In further embodiments the sensor device determines the period of motion by collecting movement data from an inertial sensor, autocorrelating the movement data, finding peaks in the auto-correlated movement data, and determining a period for at least some of the peaks.

In further embodiments the sensor device determines a period of motion by estimating a motion using an inertial sensor, estimating periodicity of the motion, and estimating a period of motion using the periodicity.

In further embodiments the sensor device is coupled to camera device to receive captured frames and wherein the sensor device determines a period of motion by analyzing the captured frames received from the camera device using video motion estimation.

In further embodiments the camera device further performs a frame rate conversion on the captured video frames before storing.

In further embodiments adjusting a frame capture rate comprises adjusting a blanking interval between frames.

Some embodiments pertain to a portable video camera that includes a sensor device to determine a period of motion of a moving object to which the camera is attached, a camera device to capture video frames at a frame capture rate, the camera device being coupled to the sensor device to receive the period of motion and to adjust the frame capture rate based on the period of motion, and a storage device to store the captured video frames locally.

In further embodiments the camera further encodes the captured video frames before storing.

In further embodiments camera device adjusts the frame capture rate by adjusting the frame rate without changing the frame capture duration of a rolling shutter.

Some embodiments pertain to an apparatus that includes means for determining a period of motion of a moving object, means for adjusting a frame capture rate of a video camera attached to the moving object based on the period of motion, means for capturing video frames at the adjusted frame rate, and means for storing the captured video frames.

In further embodiments the means for determining a period of motion performs collecting movement data from an inertial sensor connected to a video camera, autocorrelating the movement data, finding peaks in the auto-correlated movement data, and determining a period for at least some of the peaks.

In further embodiments the means for determining a period of motion performs estimating a motion using an inertial sensor, estimating periodicity of the motion, and estimating a period of motion using the periodicity.

In further embodiments the means for determining a period of motion analyzes captured frames from the video camera using video motion estimation.

In further embodiments the sensor device is attached to the camera device through the moving object.

In further embodiments the moving object is a person.

Further embodiments include means for performing a frame rate conversion on the captured video frames before storing.

In further embodiments performing a frame rate conversion comprises converting the frame rate to a standardized and fixed frame rate.

Further embodiments include means for encoding the captured video frames before storing.

In further embodiments the means for adjusting a frame capture rate adjusts a blanking interval between frames.

In further embodiments the means for adjusting a frame capture rate adjusts the frame rate without changing the frame capture duration of a rolling shutter.

What is claimed is:

1. A method comprising
   determining a period of motion of a moving object at a sensor device, wherein the moving object is moving relative to an inertial reference, the period of motion including a first time and a second time, the first time indicating a beginning of the period and the second time indicating an end of the period;
   adjusting a frame capture rate of a video camera attached to the moving object based on the period of motion to capture a frame at the first time and the second time, wherein a position of the moving object relative to the inertial reference at the first time is similar to the position of the moving object relative to the inertial reference at the second time;
   capturing video frames of a scene in the field of view of the video camera that is not moving relative to the inertial reference at the adjusted frame rate; and
   storing the captured video frames.

2. The method of claim 1, wherein determining the period of motion comprises:
   collecting movement data from an inertial sensor connected to a video camera;
   autocorrelating the movement data;
   finding peaks in the auto-correlated movement data; and
   determining a period for at least some of the peaks.

3. The method of claim 1, wherein determining the period of motion comprises:
   estimating a motion using an inertial sensor;

estimating periodicity of the motion; and
estimating the period of motion using the periodicity.

4. The method of claim 1, wherein determining the period of motion comprises analyzing captured frames from the video camera using video motion estimation.

5. The method of claim 1, wherein the sensor device is attached to the camera device through the moving object.

6. The method of claim 5, wherein the moving object is a person.

7. The method of claim 1, further comprising performing a frame rate conversion on the captured video frames before storing.

8. The method of claim 7, wherein performing a frame rate conversion comprises converting the frame rate to a standardized and fixed frame rate.

9. The method of claim 1, further comprising encoding the captured video frames before storing.

10. The method of claim 1 wherein adjusting a frame capture rate comprises adjusting a blanking interval between frames.

11. The method of claim 1 wherein adjusting a frame capture rate comprises adjusting the frame rate without changing the frame capture duration of a rolling shutter.

12. An apparatus comprising:
  a sensor device to determine a period of motion of a moving object, wherein the moving object is moving relative to an inertial reference, the period of motion including a first time and a second time, the first time indicating a beginning of the period and the second time indicating an end of the period;
  a camera device attached to the moving object to capture video frames of a scene in the field of view of the video camera that is not moving relative to the inertial reference at a frame capture rate, the video camera being coupled to the sensor device to receive the period of motion that includes a first time and a second time, and to adjust the frame capture rate based on the period of motion to capture a frame at the first time and the second time, wherein a position of the moving object relative to the inertial reference at the first time is similar to the position of the moving object relative to the inertial reference at the second time; and
  a storage device to store the captured video frames.

13. The apparatus of claim 12, wherein the sensor device determines the period of motion by:
  collecting movement data from an inertial sensor;
  autocorrelating the movement data;
  finding peaks in the auto-correlated movement data; and
  determining the period for at least some of the peaks.

14. The apparatus of claim 12, wherein the sensor device determines the period of motion by:
  estimating a motion using an inertial sensor;
  estimating periodicity of the motion; and
  estimating the period of motion using the periodicity.

15. The apparatus of claim 12, wherein the sensor device is coupled to camera device to receive captured frames and wherein the sensor device determines the period of motion by analyzing the captured frames received from the camera device using video motion estimation.

16. The apparatus of claim 12, wherein the camera device further performs a frame rate conversion on the captured video frames before storing.

17. The apparatus of claim 12 wherein adjusting a frame capture rate comprises adjusting a blanking interval between frames.

18. A portable video camera comprising:
  a sensor device to determine a period of motion of a moving object to which the camera is attached, wherein the moving object is moving relative to an inertial reference, the period of motion including a first time and a second time, the first time indicating a beginning of the period and the second time indicating an end of the period;
  a camera device to capture video frames of a scene in the field of view of the video camera that is not moving relative to the inertial reference at a frame capture rate, the camera device being coupled to the sensor device to receive the period of motion and to adjust the frame capture rate based on the period of motion to capture a frame at the first time and the second time, wherein a position of the moving object relative to the inertial reference at the first time is similar to the position of the moving object relative to the inertial reference at the second time; and
  a storage device to store the captured video frames locally.

19. The camera of claim 18, wherein the camera further encodes the captured video frames before storing.

20. The camera of claim 18 wherein camera device adjusts the frame capture rate by adjusting the frame rate without changing the frame capture duration of a rolling shutter.

* * * * *